Jan. 13, 1925.

C. S. MOORE

ATTACHMENT FOR MOTOR VEHICLES

Filed Oct. 26, 1923

1,522,692

Inventor
C. S. MOORE

By _Ch. Farbun_
Attorney

Patented Jan. 13, 1925.

1,522,692

UNITED STATES PATENT OFFICE.

CLARENCE S. MOORE, OF LEXINGTON, KENTUCKY.

ATTACHMENT FOR MOTOR VEHICLES.

Application filed October 26, 1923. Serial No. 670,977.

*To all whom it may concern:*

Be it known that I, CLARENCE S. MOORE, a citizen of the United States, residing at Lexington, in the county of Fayette and State of Kentucky, have invented certain new and useful Improvements in Attachments for Motor Vehicles, of which the following is a specification.

This invention relates to attachments for motor vehicles, and more particularly to glare shields.

An object of the invention is the provision of a shield for use in passing other vehicles at night to shield the driver from the glaring rays of lights of the approaching vehicle and consists of a device that is normally closed, and means for automatically opening the device when desired.

A further object of the invention is the provision of means operated by the suction of the intake manifold of the engine for retaining the device in operative position.

Figure 1:
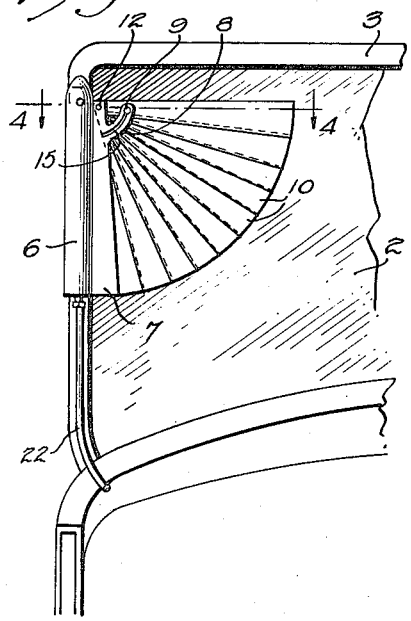
Figure 3:
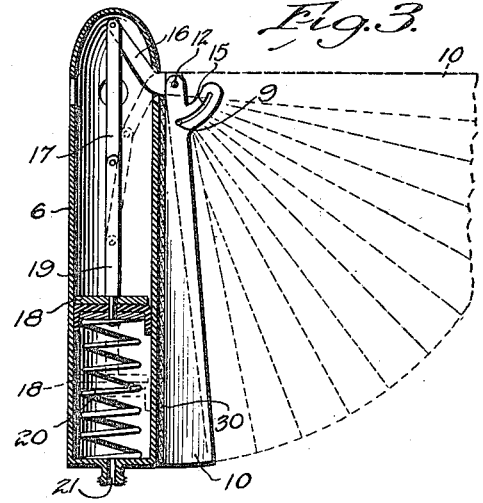
Figures 2, 6:
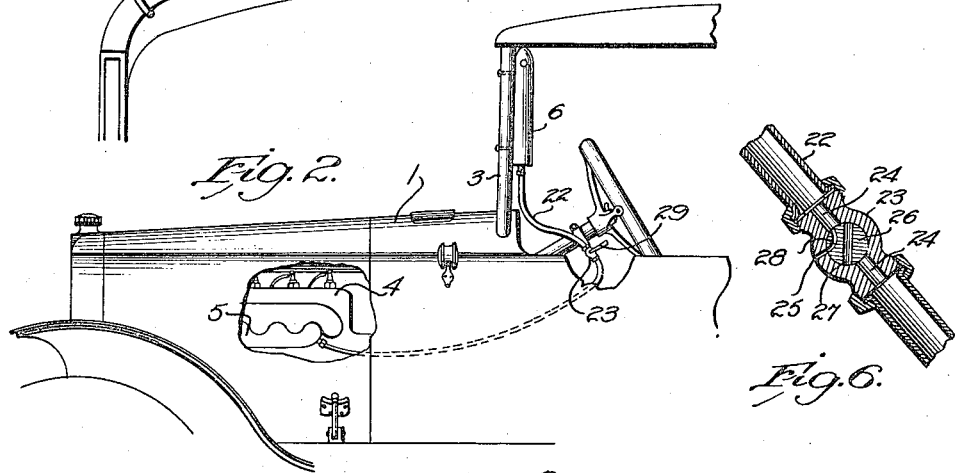
Figure 4:
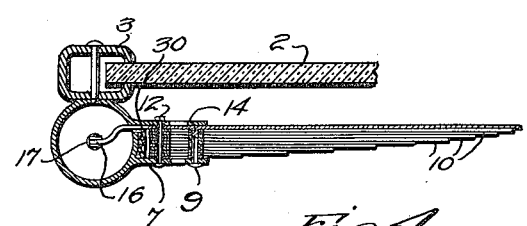
Figure 5:
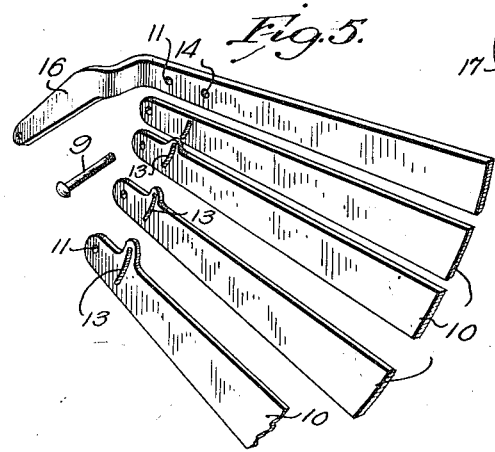

In the accompanying drawings, I have shown one embodiment of the invention. In this showing:

Figure 1 is a rear elevation of the windshield of a motor vehicle showing the invention applied, Figure 2 is a side elevation of a portion of a motor vehicle showing the connection to the manifold, parts being shown in section, Figure 3 is a front elevation of the device detached, the cylinder and piston being shown in section, Figure 4 is a horizontal sectional view on line 4—4 of Figure 1, Figure 5 is a detail view of the shield disassembled and, Figure 6 is a sectional view of a portion of the conduit showing the valve.

Referring to the drawings, the reference numeral 1 designates generally a motor vehicle having a windshield 2 formed of glass or other transparent material. The windshield is mounted in the usual metal frame 3. The vehicle is provided with an engine 4, having an intake manifold 5. The parts heretofore described are of the usual construction and form no part of the invention except in the combination claimed.

The device forming the subject matter of the present invention consists of a substantially fan-shaped shield adapted to be arranged on the windshield frame in front of the driver's seat and cover a portion of the windshield when in operative position. As shown, a cylinder 6 is secured to the windshield frame in any suitable manner and this cylinder carries a lower stationary plate 7, having an arcuate arm 8 projecting therefrom. This arm is provided with a slot 9. The shield further comprises a plurality of movable blades 10, each of which is provided with an opening 11, for the reception of a pivot pin 12, carried by the stationary plate. Adjacent the pivot the blades are provided with slots 13 which, as shown, decrease in length from the bottom of the shield to the top. The upper blade is provided with an opening 14, adapted to receive a pin 15, and this pin passes through the slots 13 and the slot 9. The upper blade is further provided with an arcuate extension 16, passing through an opening in the cylinder 6 and secured to a link 17, within the cylinder. A piston 18 is mounted in the cylinder and this piston is provided with a piston rod 19, connected to the link 17. A spring 20 is arranged in the cylinder beneath the piston and is adapted to retain the piston in raised position when the pressures above and below the piston are substantially equal. The lower end of the cylinder is provided with an opening 21 and a pipe or conduit 22 is connected thereto. As shown, the pipe or conduit extends downwardly to the steering wheel and is provided with a valve casing 23, arranged immediately beneath the steering wheel. This valve casing is provided with oppositely disposed passages 24, connected to the adjacent sections of the pipe 22 and is further provided with a passage 25, communicating with the atmosphere. The valve is provided with a rotatable plug 26, having a central passage 27 adapted to connect the passages 24 when the valve is in one position. The plug is further provided with a curved passage 28, adapted to connect the cylinder side of the conduit of the atmosphere when the valve is in a second position. A handle 29 is secured to the plug exteriorly of the casing to permit operation of the valve. A strip 30 of felt or other suitable cushioning material is arranged between the cylinder and the blades. This cushions the blades in returning to closed position and further prevents rattling when the blades are in closed position and the vehicle is passing over uneven surfaces in a roadway.

The operation of the device is as follows:

In normal driving, the parts are in the position shown in full lines in Figure 3 of the drawings. When approaching a vehicle having glaring headlights, the driver moves the valve plug from the position shown in Figure 6 of the drawings to a position connecting the passages 24 by the passage 27 of the plug. The lower end of the cylinder is then connected to the intake manifold and the suction existing therein lowers the piston against the tension of the spring 20 and swings the angular extension 16 of the upper blade downwardly, as indicated in dotted lines. This lifts the upper blade and the pin 15, riding in the slots 13 of the other blades, opens them to the position shown in dotted lines in Figure 3 of the drawings and in full lines in Figure 1. This shuts off the glaring rays, and permits the driver to see the road to the right of the glare shield. The blades are preferably formed of aluminum or other similar light metal. As soon as the valve is returned to the position shown in Figure 6 of the drawings, and equal pressure again established in the ends of the cylinder, the piston is raised by the spring, returning the parts to their normal position.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. A glare shield comprising a fixed blade, an arcuate extension formed on said blade, said extension being provided with a slot, a plurality of pivoted blades mounted on said fixed blade, said pivoted blades being provided with arcuate slots, a pin carried by one of said blades and passing through said slots, and operating means connected to said last mentioned blade.

2. A glare shield comprising a fixed blade mounted on the windshield of a motor vehicle, a plurality of pivoted blades disposed in alinement with said fixed blade when in closed position, said blades being provided with slots of progressively decreasing size, a pin carried by one of said blades and passing through said slots, and operating means controlled by the suction normally existing in the manifold of the engine to move said last mentioned blade about its pivot.

3. A glare shield for motor vehicles comprising a cylinder, a piston mounted in said cylinder, a conduit connecting said cylinder to the intake manifold of the engine, a spring arranged in said cylinder adapted to normally retain said piston in one position, a fixed blade mounted adjacent said cylinder, a plurality of pivotally mounted blades, a pivot pin passing through said blades and received in said fixed blade, said pivotally mounted blades being provided with slots of progressively decreasing lengths, a pin carried by one of said movable blades, and connections between said last mentioned blade and said piston.

4. A glare shield comprising a fixed blade, an arcuate extension formed on said blade, said extension being provided with a slot, a plurality of pivoted blades mounted on said fixed blade, said pivoted blades being provided with arcuate slots of progressively decreasing size, a pin carried by one of said blades and passing through said slots, an arm formed on one of said blades and extending beyond its pivot, and means controlled by the suction normally existing in the manifold of the engine and engaging said arm to swing it on its pivot.

In testimony whereof, I affix my signature in presence of two witnesses.

CLARENCE S. MOORE.

Witnesses:
J. R. SMITH,
S. H. NICKELL.